C. H. CLARK.
MILK STRAINER.
APPLICATION FILED OCT. 22, 1912.
1,080,262.
Patented Dec. 2, 1913.
2 SHEETS—SHEET 1.
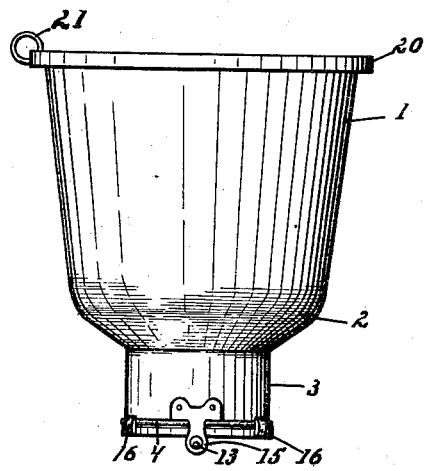
Fig. I.
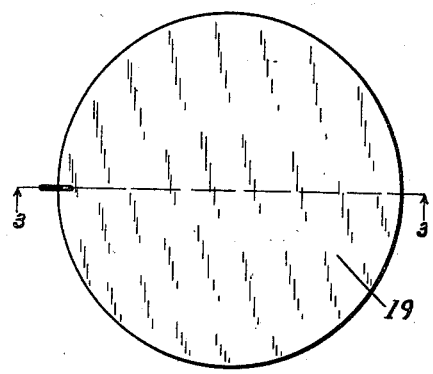
Fig. II.
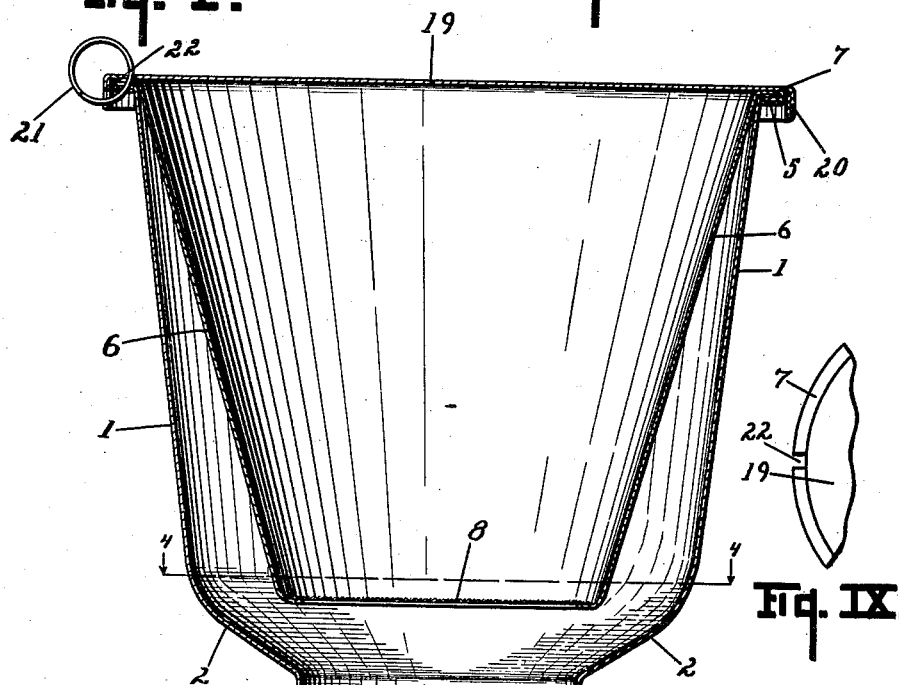
Fig. III.
Fig. IX.
Witnesses
Margaret Glasgow
L. G. Greenfield
Inventor
Charles H. Clark
By Chappell & Earl
Attorneys C. H. CLARK.
MILK STRAINER.
APPLICATION FILED OCT. 22, 1912.
1,080,262.
Patented Dec. 2, 1913.
2 SHEETS—SHEET 2.
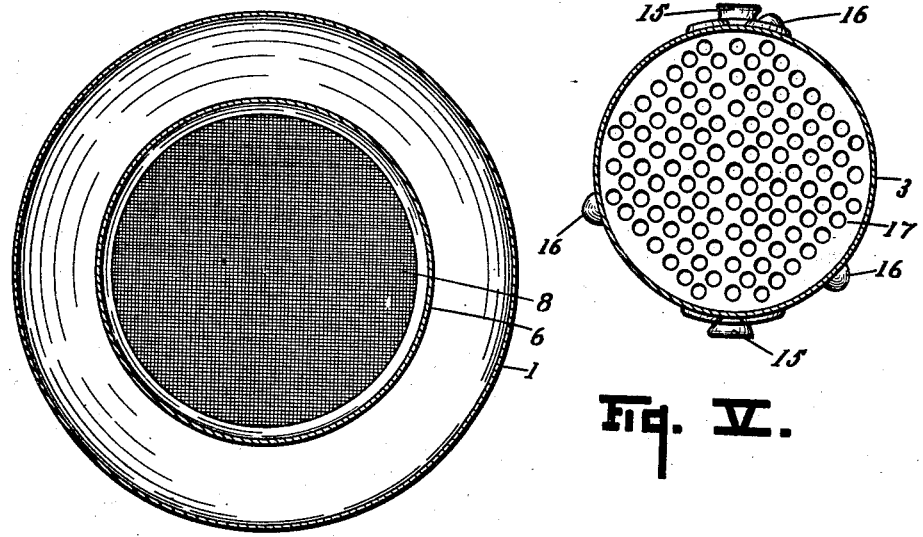
Fig. IV.
Fig. V.
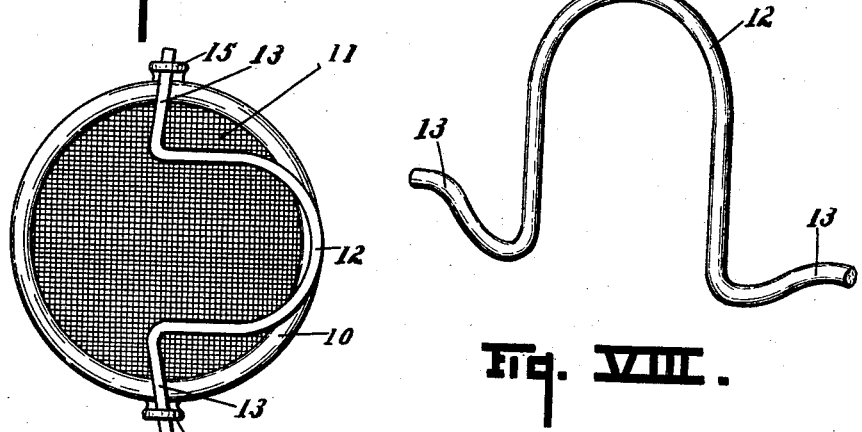
Fig. VI.
Fig. VIII.
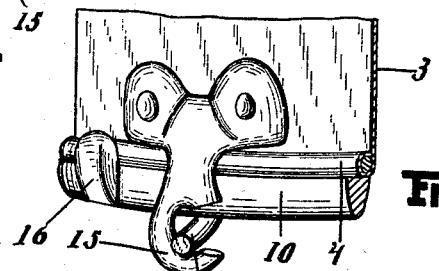
Fig. VII.
Witnesses
Margaret Glasgow.
L. S. Greenfield
Inventor
Charles H. Clark
By Chappell Earl
Attorneys

UNITED STATES PATENT OFFICE.

CHARLES H. CLARK, OF KALAMAZOO, MICHIGAN.

MILK-STRAINER.

1,080,262.   Specification of Letters Patent.   Patented Dec. 2, 1913.

Application filed October 22, 1912. Serial No. 727,095.

*To all whom it may concern:*

Be it known that I, CHARLES H. CLARK, a citizen of the United States, residing at Kalamazoo, Michigan, have invented certain new and useful Improvements in Milk-Strainers, of which the following is a specification.

This invention relates to improvements in milk strainers.

The main objects of this invention are to provide an improved milk strainer and filter which is simple in structure and operation and easily cleaned and kept in a sanitary condition.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a side elevation of my improvement in milk strainers and filters. Fig. II is a plan view thereon. Fig. III is a vertical central section on a line corresponding to line 3—3 of Fig. II. Fig. IV is a horizontal section on a line corresponding to line 4—4 of Fig. III. Fig. V is a horizontal section on a line corresponding to line 5—5 of Fig. III. Fig. VI is a bottom view, the body of the receptacle not being shown. Fig. VII is a detail perspective view showing one of the details of the filtering pad support. Fig. VIII is a perspective view of the clamp member 12. Fig. IX is a detail plan view of the inner receptacle 6.

In the drawing similar reference characters refer to similar parts throughout the several views, and the sectional views are taken looking in the direction of the little arrows at the ends of the section lines.

Referring to the drawing, the outer receptacle 1 is preferably tapered downward and drawn abruptly in at 2 to an open neck 3 at its lower end. The lower end of the neck is provided with a bead 4. At its upper end the receptacle 1 is provided with a flange-like rim 5. The inner receptacle 6 is provided with a flange-like rim 7 at its upper end adapted to rest on the rim of the outer receptacle. The inner receptacle 6 is tapered downwardly so that there is a space between its walls and the walls of the receptacle 1. The inner receptacle 6 is provided with a screen bottom 8 which is supported adjacent to but spaced from the neck 3 of the outer receptacle.

The neck 3 is provided with a filtering pad 9 of absorbent cotton, fabric or other suitable fibrous material. The pad 9 is supported by a support comprising a rim 10 having a comparatively coarse screen 11 thereon. The support is secured to the neck by the clamping member 12 which is U-shaped, the ends of its arms being turned laterally and conformed to provide cam members 13. These cam members are adapted to engage in ears 15 on the neck.

The rim 10 is provided with upwardly projecting lugs 16 which embrace the bead 4 of the neck. The pad 9 is arranged with its edges between the support and the lower end of the neck. The clamping member 12 is engaged with the ears with its cams outwardly, the clamp member is then swung over and its cams acting on the rim clamp the support in place.

To prevent the pad being displaced by the impact or the current of milk as might occur where the pad is made of loose material, such as cotton batting or absorbent cotton, I provide a foraminated plate 17 adapted to fit within the neck. This plate is provided with a flange 18 at its edge, by which it is normally supported out of contact with the pad. The plate 17 distributes the milk to the pad quite evenly. The screen 8 of the inner receptacle also assists in distributing the milk or other liquid evenly to the filtering pad. This screen is preferably quite a fine screen so that it collects the coarser material.

I preferably provide a cover 19 having a down turned flange 20 at its edge adapted to fit over the flanges of the receptacles. The cover 19 is loosely secured to the rim 5 of the outer receptacle by ring 21. This cover connection is of advantage in that it does not provide unsanitary corners or creases. The rim 7 of the inner receptacle 6 is notched to receive the ring 21.

My improved strainer is easily assembled or disassembled and when disassembled the parts are easily cleansed and kept in a sanitary condition, that being one of the main objects of this invention. Further, my improved strainer or filter is very effective.

I have illustrated and described my improvements in detail in the form in which I have embodied the same. I have not attempted to illustrate or describe various modifications in structural detail which I contemplate as being possible as such modifications will be readily understood by those skilled in the art to which this invention relates.

Having thus described my invention, what I claim is new and desire to secure by Letters Patent is:

1. In a strainer, the combination of an outer receptacle having a flange-like rim at its upper end and an open neck at its lower end; a filter pad support comprising a rim having a screen thereon; clamping means by which said support is removably secured to said neck; a filter pad arranged on said support with its edges between the end of the neck and said support; a foraminated plate having down-turned flanges at its edges disposed within the neck upon said pad; an inner downwardly tapered receptacle provided with a screen bottom and having a rim resting on the rim of said outer receptacle, the bottom of said inner receptacle being adjacent to but spaced from the neck of said outer receptacle; and a cover having a flange adapted to close over the rims of said receptacles and secured to the rim of the outer receptacle by a ring, the rim of the inner receptacle being notched to receive the ring.

2. In a strainer, the combination of an outer receptacle having an open neck at its lower end; a filter pad support comprising a rim having a screen thereon; clamping means by which said support is removably secured to said neck; a filter pad arranged on said support with its edges between the end of the neck and said support; a foraminated plate having down-turned flanges at its edges disposed within the neck upon said pad; an inner downwardly tapered receptacle provided with a screen bottom and having a rim resting on said outer receptacle, the bottom of said inner receptacle being adjacent to but spaced from the neck of said outer receptacle.

3. In a strainer, the combination of an outer receptacle having a flange-like rim at its upper end and an open neck at its lower end; a filter pad support comprising a rim having a screen thereon; means by which said support is removably secured to said neck; a filter pad arranged on said support; an inner downwardly tapered receptacle provided with a screen bottom and having a rim resting on the rim of said outer receptacle, the bottom of said inner receptacle being adjacent to but spaced from the neck of said outer receptacle; and a cover having a flange adapted to close over the rims of said receptacles and secured to the rim of the outer receptacle by a ring, the rim of the inner receptacle being notched to receive the ring.

4. In a strainer, the combination of an outer receptacle having a flange-like rim at its upper end and an open neck at its lower end; a filter pad support comprising a rim having a screen thereon; means by which said support is removably secured to said neck; a filter pad arranged on said support; an inner downwardly tapered receptacle provided with a screen bottom and having a rim resting on the rim of said outer receptacle, the bottom of said inner receptacle being adjacent to but spaced from the neck of said outer receptacle; and a cover having a flange adapted to close over the rims of said receptacles and secured to the rim of the outer receptacle by a ring, the rim of the inner receptacle being notched to receive the ring.

5. In a strainer, the combination of a receptacle having an open neck at its lower end; a filter pad support comprising a rim having a screen thereon, said rim being provided with upwardly projecting lugs engaging the neck; a U-shaped clamping member having laterally turned cam members at the ends of its arms; ears on said neck projecting below said rim to receive said cam members; and a filter pad arranged in said support with its edges between the end of the neck and said support.

6. In a strainer, the combination of a receptacle having an open cylindrical neck at its lower end, said neck being of uniform diameter from end to end; a removable foraminated pad support; means for clamping said support against the lower end of the neck; a filter pad disposed upon said support with its edges clamped between the support and the lower edge of the neck; and a foraminated plate loosely disposed within the neck and having downturned flanges at its edges resting upon the said filter pad, whereby the body of the plate is supported adjacent to but does not rest upon the pad, said plate being freely removable and entirely disconnected from the receptacle and its neck.

7. In a strainer, the combination of a receptacle having an open neck at its lower end; a foraminated pad support; means for clamping said support against the lower end of said neck, said support being freely removable when said clamp is released; a filter pad disposed on said support with its edges clamped between the pad support and the lower edge of the neck; and a freely removable plate arranged loosely within said neck upon the pad and engaging the pad only as it rests thereon and being entirely free and disconnected from the receptacle and its neck.

In witness whereof, I have hereunto set my hand and seal in the presence of two witnesses.

CHARLES H. CLARK. [L. S.]

Witnesses:
LUELLA G. GREENFIELD,
MARY LEVISON.